July 8, 1952     C. L. PETERSON     2,602,549
FILTERING APPARATUS

Filed Oct. 2, 1945     4 Sheets-Sheet 2

CLARENCE LYNN PETERSON
INVENTOR.

BY

ATTORNEY

July 8, 1952 C. L. PETERSON 2,602,549
FILTERING APPARATUS
Filed Oct. 2, 1945 4 Sheets-Sheet 4
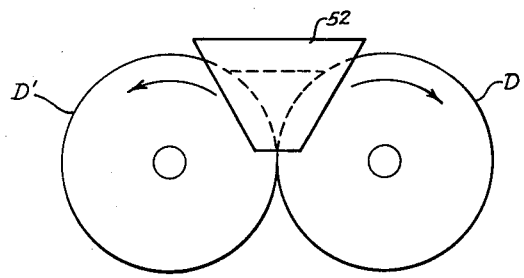
FIG.—4
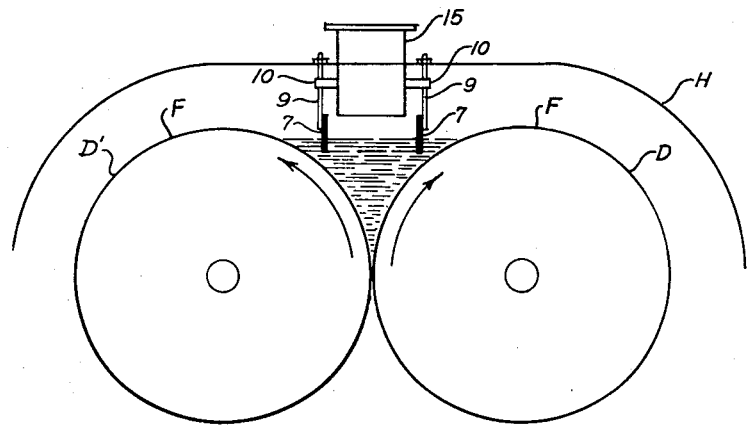
FIG.—5
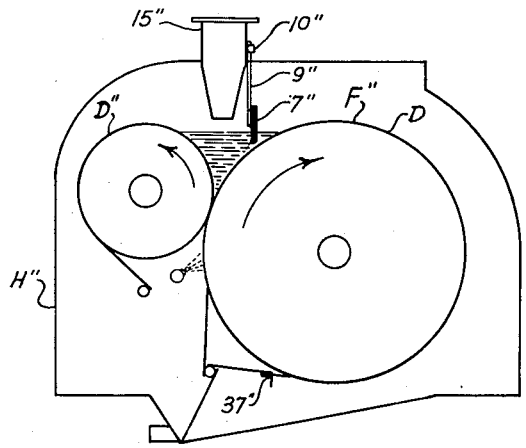
FIG.—6
INVENTOR.
CLARENCE LYNN PETERSON
BY
ATTORNEY

Patented July 8, 1952

2,602,549

UNITED STATES PATENT OFFICE 2,602,549

FILTERING APPARATUS

Clarence Lynn Peterson, Salt Lake City, Utah, assignor to Peterson Filters and Engineering Co., Salt Lake City, Utah, a partnership Application October 2, 1945, Serial No. 619,848

4 Claims. (Cl. 210—199)

This invention relates to filtration, and more particularly to a method of and apparatus for removing solids or cake and filtrate from fluent matter, such as a pulp consisting of solid particles carried by a liquid, as in suspension. Normally, such operations are accomplished by the controlled subjection of fluent matter resting on or against a filtering medium, to vacuum, pressure, or other influences.

This application is a continuation-in-part of my co-pending Patent No. 2,499,412, filed October 4, 1943. As disclosed therein, fluent matter is supplied to a space between and above a pair of parallel cylindrical drums rotated in opposite directions, the exterior of at least one drum being covered with a filtering medium and the drums contacting or at least closely approaching one another along a horizontal line. It will be understood that the method and apparatus of this invention may be used to advantage in connection with other methods and apparatuses, as will more fully appear hereinafter.

Among the objects of this invention are to provide a more efficient and effective filtering method, particularly wherein the fluent matter or pulp contains a relatively large amount of slimes or more finely divided particles; to provide such a method in which an endless rotary filter medium is utilized; to provide such a method in which the slimes and finer particles tend to be separated from the coarser particles of a body of fluent matter to be filtered; to provide such a method which is particularly useful in conjunction with an upwardly moving and inclined filter medium; to provide such a method by which the deposition of slimes on top of a filter cake may be substantially inhibited; to provide such a method which produces a more effective distribution of fluent matter to a filter medium; to provide such a method in which solids are deposited upon a filtering medium surface or surfaces in a more effective and efficient manner; to provide such a method in which slimes and finer particles are separated from coarser particles and may be removed separately from the body of fluent matter to be filtered; to provide apparatus particularly adapted to carry out the above method; to provide such apparatus which includes adjustable means for controlling the flow of solids in a body of fluent matter to be filtered; to provide such apparatus which includes a pair of cylindrical drums providing a fluent matter space above and between the filter medium surfaces of the drums; to provide such apparatus in which the surface area of the body of fluent matter to be filtered fluent matter; to provide such apparatus which includes improved end seals for the cylindrical drums; to provide such apparatus which includes improved means for feeding pulp to the body of of fluent matter; to provide such apparatus which effectively removes separated slimes and more finely divided particles, and also maintains the body of fluent matter at a predetermined level; to provide such apparatus which is operable under varying conditions and which may be adjusted in accordance with such conditions and to provide such apparatus which is effective and efficient in operation. Other objects and the novel features of this invention will become apparent from the description which follows:

An improved filtering method in accordance with this invention may comprise the steps of establishing a body of pulp consisting of a liquid containing solid particles above an inclined portion of a filter medium, feeding pulp to the body, and controlling the movement of solid particles in the body of pulp, so as to restrain the flow of slimes and more finely divided particles to the filter medium. Such improved filtering method may further include positioning a pair of cylindrical filter medium surfaces so as to at least closely approach contact along a substantially horizontal line, rotating the surfaces in opposite directions and upwardly from the line of close approach, establishing the body of fluent matter between the surfaces and above the line of close approach, restraining the flow of slimes and more finely divided particles along a line adjacent each side of the body but spaced from the juncture of the surface of the body and the filter mediums, and overflowing pulp containing slimes and more finely divided particles from one or both ends of the body of pulp at a point or points spaced from the filter mediums.

Apparatus particularly adapted to carry out the foregoing method is illustrated in the accompanying drawings, in which:

Fig. 4 is an end elevation in section showing the relation of end seal check plates to filter drums;

Fig. 5 is an end elevation in partial section showing the location of baffle plates with respect to the pulp body; and, Fig. 6 is an elevation in partial section showing a modification of my invention.

Figure 1:
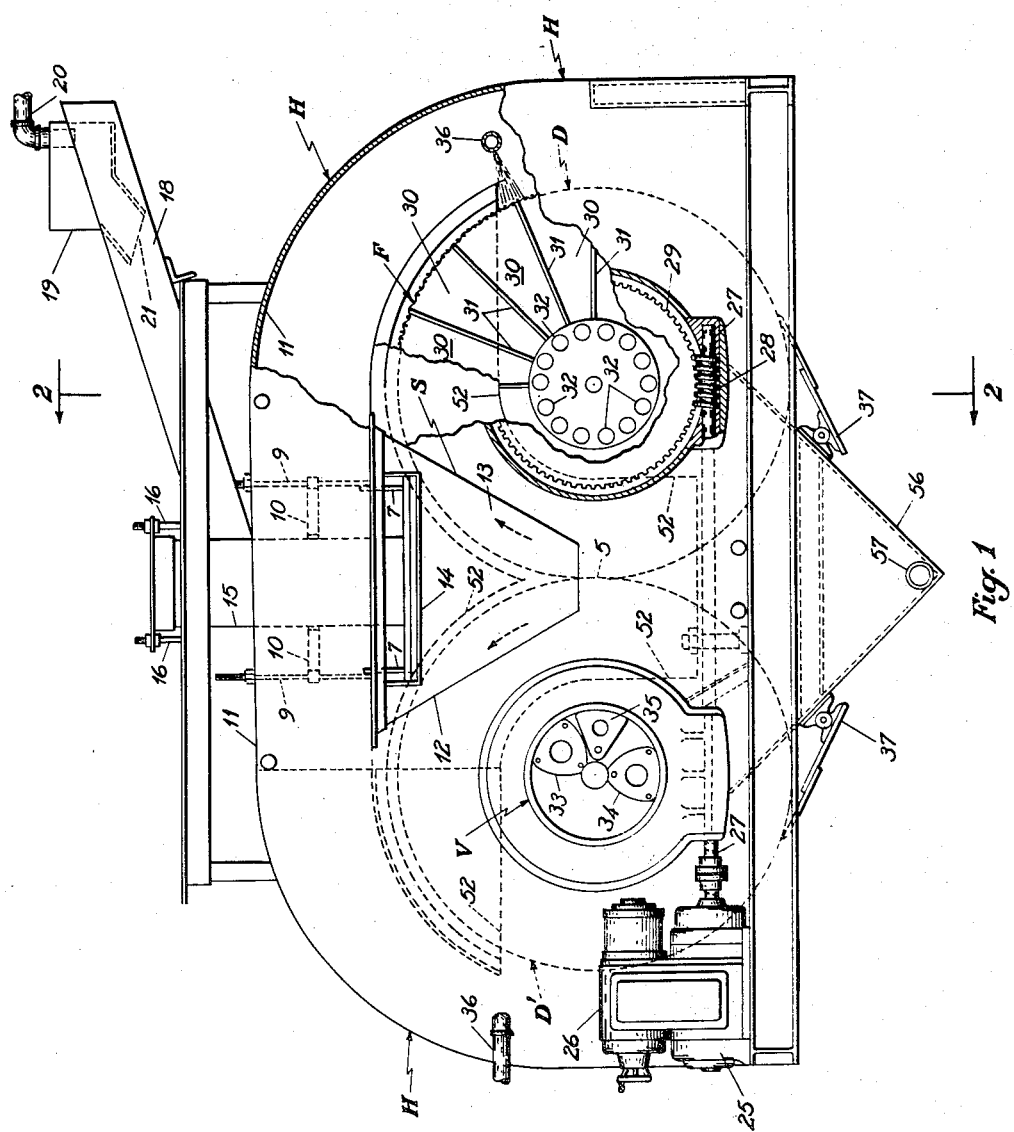
Fig. 1 is an end elevation, partly in section, of a double drum filtering apparatus constructed in accordance with this invention.

As illustrated in the drawings, apparatus constructed in accordance with this invention may comprise a pair of drums D and D' having parallel axes and disposed in substantially tangential relationship in a housing H. The cylindrical peripheral surface of each drum is covered with a filtering medium F, such as a suitable filtering cloth, and the filtering cloths touch or closely approach contact along a horizontal line passing through a point 5 of Fig. 1.

A body 6 of fluent matter is maintained in the space above and between the drums by end seals S, and liquid or filtrate is drawn therefrom through filter medium F and a layer or cake of solid particles is deposited on the filter medium. The body 6 of fluent matter is composed generally of solid particles, sometimes larger and sometimes smaller in different proportions in accordance with the grinding or other treatment which has produced the same. The larger particles tend to sink to the lower portion of the body of fluent matter, and thereby tend to be deposited first on the filter medium F. The slimes and more finely divided particles tend to remain nearer the top of the body of fluent matter and be deposited on top of the larger particles. This is normally a desirable occurrence, since the slimes tend to clog the filter medium if deposited first, and would tend to decrease considerably the effectiveness of the filtering operation. However, as soon as the slimes are deposited in any appreciable amount upon the cake, a considerably higher vacuum is necessary to draw filtrate or liquid through the filter medium, thus decreasing the amount of liquid that may be recovered. Also, a layer of slimes on top the larger particles tends to impede subsequent washing operations, so that an appreciable amount of liquid often remains in the cake, which is particularly detrimental when the liquid includes values to be recovered and the cake is to be thrown away. Also, if the cake should be pure, the presence of liquid in the cake may be a further loss due to such contamination.

In accordance with this invention, the movement of solids in the body of fluent matter is controlled, to restrain the movement of slimes and more finely divided particles to the filtering medium, by baffles 7 parallel to but spaced from the juncture 8 between the surface of the body 6 and the filtering mediums. The baffles 7 are adjustable vertically by rods 9 which pass through guides 10 and depend from a top sheet 11 of housing H. The baffles extend longitudinally substantially the entire length of the drums, and the vertical position thereof is adjusted so that the baffles extend slightly into the body of fluent matter, thereby preventing the direct movement of the top layer of fluent matter to the filtering medium. This causes the upper layer of fluent matter contiguous to the filter medium surfaces, i. e. between the baffles 7 and the filter medium surfaces, to come only from beneath the baffles. Since the fluent matter beneath the baffles contains larger sized particles, the fluent matter flowing to the top layer outside the baffles, i. e. between the baffles and the filter medium surfaces, will also contain these larger sized particles. By controlling the flow of slimes in this manner, i. e. by restraining the flow thereof, a separation of slimes and more finely divided particles is effected.

By so restraining the flow of slimes and more finely divided particles, there is also a relatively natural flow thereof along and inside the baffles toward the ends of the drums. This produces a relative concentration of slimes at the ends and, in further accordance with this invention, the space for containing the body 6 of fluent matter is extended, as by end boxes 12 of seals S, having inclined bottoms 13 to provide a considerably greater surface area for body 6 of fluent matter.

In further accordance with this invention, a vertically adjustable weir overflow 14 is provided at each box 12 for a dual purpose. First, the weir overflows regulate and maintain substantially constant the level of the body of fluent matter, thereby tending to insure a more uniform filtering operation. Second, the weir overflows effect the removal of the surface layer of the body 6 caused to pass thereto by the baffles 7, thereby removing the slimes and more finely divided particles. The combination of baffles 7 and weir overflows 14 with end boxes 12 results in effectively preventing slimes from reaching the filter mediums or cake deposited thereon, so that these elements act not only to enhance the operation of the filter, but also provide a separation of the slimes from the larger particles. It has been found, in actual practice, that particles of less than 200 mesh can be effectively separated in the above manner.

Figure 3:
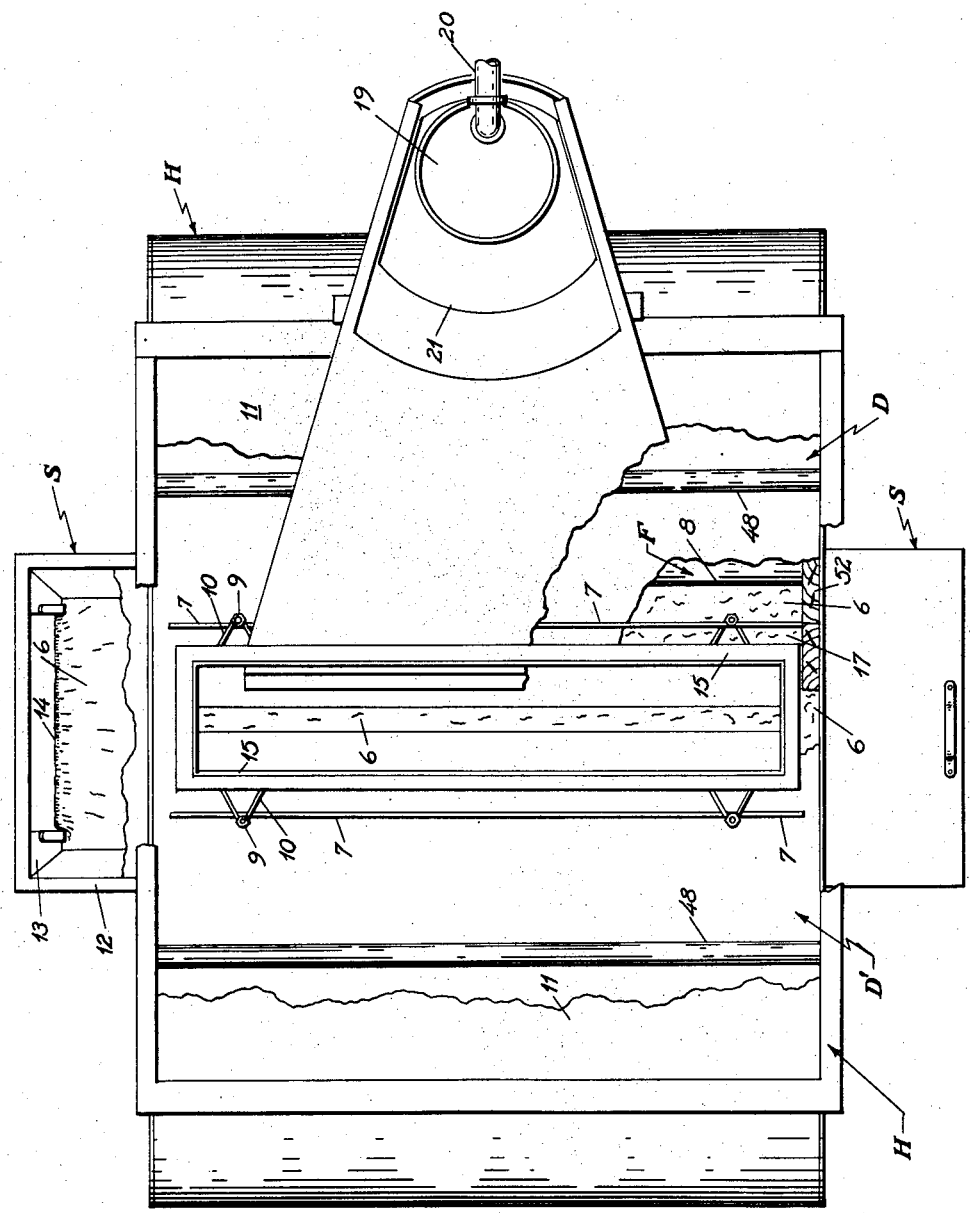
Fig. 3 is a top plan view, partially broken away to show the interior construction of the apparatus of Fig. 1, modified with respect to the feed device.

In further accordance with this invention, the fluent matter to be treated is fed into the body 6 in a substantially uniform manner, and distributed evenly to the space between the baffles through a feed box 15 which is vertically adjustable by rods 16 and which provides a space in which slimes and other finely divided particles may collect. Feed box 15, on which guides 10 are mounted, may be rectangular in shape, as in Fig. 1, or the sides thereof may taper downwardly, as in Fig. 3. Feed box 15 extends into the body of fluent matter to a sufficient depth to obtain a desired circulation of solids in the body of fluent matter, i. e., to insure that the larger particles will tend to settle downwardly, and also that the slimes and smaller particles will tend merely to pass beneath the edges of the feed box into space 17 between the feed box and the baffles. In this space, slimes and more finely divided particles flow toward each end of the body of fluent matter, such slimes and the like tending to collect in the enlarged areas provided by end boxes 12 and to be discharged through weirs 14. Normally, the baffles will be adjusted to extend to a deeper position in the body of fluent matter, so that the slimes will tend to pass under the edges of the feed box, but will not tend to pass under the baffles.

The fluent matter is supplied uniformly along the length of feed box 15 by an apron 18 which diverges laterally and is inclined at a sufficient angle, so that fluent matter supplied thereto from a well 19, in turn fed by a supply pipe 20, will be distributed substantially uniformly by a spreading plate 21. The fluent matter spreads out to each side of the apron until it forms a stream of substantially the same width as the length of the drums, and thus distributes the solids substantially uniformly along the length of the drums. The angle of inclination of apron 16 may be adjusted, so that the desired rate of flow and distribution of fluent matter is obtained.

The remainder of the filtration apparatus may be constructed substantially as disclosed and claimed in my copending Patent No. 2,499,412. Thus, the drums are rotated in the direction of the arrows of Fig. 1 by a motor 25 provided with a variable speed drive 26 and connected with a shaft 27 on which are mounted a pair of identical worms, such as worm 28. Each worm 28 drives a gear 29 attached to a drum, and during rotation of the drums the desired vacuum and pressure influences are exerted upon the interior of the filter medium F through a valve V, to cause deposition of solid particles upon the filter medium F, and to draw filtrate through the filter medium from body 6 of fluent matter.

Each drum is divided into sections, such as sections 30 of drum D, which are divided by partitions 31, and the filter medium F may extend entirely around the periphery of each drum, or each section may be provided with its own filtering medium, so that individual sections may be replaced when necessary. Each section is connected with a port 32 and during rotation of the drums, ports 32 are successively connected, through valve V, with a connection 33 for low vacuum, a connection 34 for high vacuum, and a connection 35 for the introduction of air and/or steam under pressure. Suitable pipes or lines lead from vacuum connections 33 and 34 to vacuum pumps or the like, and similar pipes lead from connection 35 to a suitable source of air and/or steam of a standard nature.

As the drums rotate, the filtering medium of each successive section 30 will pass into contact with body 6 of fluent matter, whereupon filtrate will begin to be withdrawn through high vacuum connection 34, and solid particles will be deposited upon the surface of the filter medium. As the drum rotates further, each section will, in turn, come under a washing spray discharged from a pipe 36, and filtrate remaining in the deposited cake will be washed out and replaced by wash water. This same washing action may be used where slimes have been deposited in the cake to wash the slimes through and out of the cake to attain a slimes sands separation. Then, the section will finally come to a scraping device 37 which may be constructed in the manner disclosed and claimed in my co-pending Patent No. 2,444,466, filed November 23, 1943. After the cake is removed, the section passes on around to repeat the cycle. If desired, as disclosed in my co-pending application Serial No. 504,831, a slight pressure may be utilized to cause the filter mediums of the oppositely disposed sections of the drums at point 5 to push outwardly, so as to contact each other during the time of close approach, thereby more effectively sealing the space between the drums and preventing undue leakage from body 6 of fluent matter.

Figure 2:
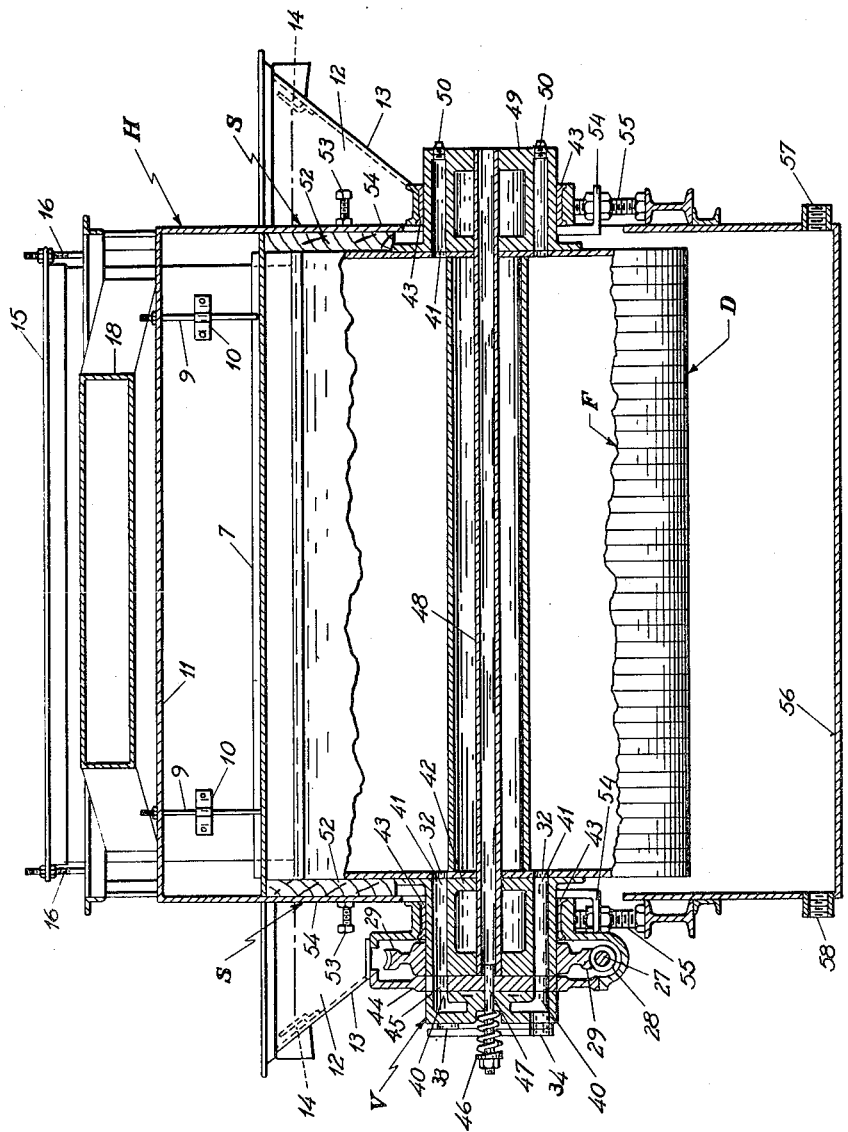
Fig. 2 is a vertical section taken along line 2—2 of Fig. 1, longitudinally of a drum.

The valve V may, as illustrated in Fig. 2, be provided with spaces 40 in the interior thereof to communicate with the low vacuum, high vacuum and air connections, for transmission of the vacuum or pressure influences to passages 41 which may be formed in a cylinder 42 to which gear 29 is attached and which rotates in a bearing 43. A plate 44 is interposed between valve V and the end of cylinder 42, the plate being provided with ports 45 corresponding in size and location to passages 41 and ports 32 for more readily turning on and shutting off pressure or vacuum to one of the sections. Valve V is held in position, and a seal obtained between the valve, plate 44, and the end of cylinder 42, by a compression spring 46 held by a rod 47 extending from a tube 48 which extends centrally of each drum and connects cylinder 42 with a cylinder 49 at the opposite end of the drum. Cylinders 42 and 49 are similar, each rotating in a bearing 43, but the passages of cylinder 49 are closed by plugs 50 which may be removed for cleaning purposes.

As indicated previously, the space between and above the drums is maintained sufficiently liquid tight, to contain the body of fluent matter 6 by end seals S which include dam plates or cheek plates 52 pressed against the top or ends of the drums by substantially uniform pressure produced by screws 53. These dam plates or cheek plates 52 are preferably formed of material which is resistant to wear and which provides a water lubricated surface to minimize frictional resistance to rotation of the drums. One material found to be satisfactory for the purpose is a laminated plastic known as "Micarta," but other materials may be used instead. In case the liquid portion of the body of fluent matter is other than water, the dam plates or cheek plates should be formed of such material that the joint between the plates and the ends of the drums will be lubricated by such liquid. The dam plates or cheek plates 52 may be supported by metal plates 54, in turn supported independently of the drums, so as to be adjustable vertically or horizontally, as by studs 55 of Fig. 2. For adequate sealing, it is desirable that the plates extend slightly above the upper periphery of each drum and also downwardly to a point below the horizontal line of substantial tangency of the drums, as in Fig. 1. It will be understood that the end boxes 12 do not engage the ends of the drums, as do cheek plates 52, but that end boxes 12 form a portion of end seals S by virtue of the fact that they act as a portion of an end dam or partition, as it were, and thereby cooperate in establishing the body 6 of fluent matter. Either end box 12 would so function without being provided with an overflow 14, but the latter of course, acts to maintain a desired level as well as remove separated slimes and the like, as explained previously.

Nothwithstanding the fact that a highly efficient seal is provided by the plates, and by the approach to close contact of the filter medium surfaces, or the contact when air pressure is utilized to force the surfaces against each other, during normal operation some leakage appears to be unavoidable. To collect such leakage, a drip pan or sump 56, as in Figs. 1 and 2, extends between and beneath the drums along the entire length thereof and may extend almost to or past the vertical center line of each drum. Sump 56 is provided with a drain connection or outlet 57 to permit fluent matter collected therein to be returned to a feed tank therefor, and also with a sluicing connection 58 to permit cleaning of the drip pan whenever necessary.

From the foregoing, it will be apparent that the method and apparatus of this invention provide a highly efficient and effective manner of separating the solids from the liquid of fluent matter and also, if desired, certain ranges of solids from the remaining solids. As pointed out, the flow of solid particles in the body of fluent matter is controlled so as to restrain the flow of slimes and the more finely divided particles to the surfaces of the filter mediums, and also to separate the slimes and more finely divided particles from the remaining particles. In addition, the separated slimes and more finely divided particles may be removed from the body of fluent matter and, concurrently therewith, the depth of the body of fluent matter is maintained at a constant value.

A separate modification of my invention is shown in Fig. 6. In this figure I have shown the use of a drum member D having a filter medium F'' formed on the outer periphery thereof. A second drum member D'' of smaller diameter than the diameter of drum D is arranged in parallel relation with drum D so that the peripheral surface of drum D'' is in substantially liquid tight engagement with filter medium F''. End seals similar to those shown and previously described are used, together with drums D'' and D, to form a liquid tight container in which a liquid pulp product may be introduced.

In operation such a pump mixture is introduced into the space formed by drums D'' and D and drums D and D'' are rotated in such manner that when the filter medium F'' of drum D is subjected to vacuumatic influences, a filter cake will form on the outer periphery of drum D. As the filter cake passes upwardly through the pulp it will pass under a baffle member 7'' which is adjustably supported on feed box 15'' by a rod 9'' and guide 10''. Adjustments of the positioning of baffle member 7'' may be made in a manner previously described to prevent the flow of slimes in the pulp body toward the filter medium F''.

From the foregoing descriptions it will be apparent that my invention is adaptable to many modifications and changes which are known in the filtration art. This application is intended to include all equivalents and substitutions. For these reasons it is to be understood that additional changes made without departing from the spirit of this invention, as defined in the appended claims, are within the scope of this invention.

What is claimed is:

1. Filtering apparatus comprising a pair of cylindrical drums having axes disposed in horizontal parallel relationship and having the outer peripheries thereof in close juxtaposition along a substantially horizontal line; means for rotating said drums in opposite directions; a filter medium mounted on the outer periphery of each drum; end seals between said drums providing a space above and between said drum so as to enclose a body of pulp containing liquid, solid particles and slimes in said space to form a pool; connections for establishing a vacuum influence on the interior of said filter medium for drawing liquid from said body through said filter medium; a pair of baffles extending between said end seals and downwardly into said pulp body at opposite sides of said pool adjacent the filter medium for restraining surface flow of slimes to said filter medium surface; and means for feeding pulp to the central portion of said pool between said baffles for effecting distribution of said pulp in said pool; said end seals providing outlet openings intermediate said baffles for the removal of slimes from the central portion of said pool.

2. Apparatus for filtering fluent matter which comprises a pair of surfaces, at least one of said surfaces being a substantially endless filtering medium surface, means for moving said filtering medium surface along a predetermined path in close juxtaposition to the other of said surfaces along a substantially horizontal line, said surfaces during movement diverging from each other above said line, means in liquid sealing engagement with said surfaces and disposed at the lateral edges thereof, means for introducing fluent matter into the space between said surfaces and said sealing means above the line to form a pool, means for subjecting the filtering medium at predetermined points to vacuum influences thereby causing solid particles from said fluent matter to be deposited upon said surface as filtrate is drawn through said medium, means for removing the deposited solids from said surface at other predetermined points, and baffle members disposed in the upper portion of the pool of fluent matter and extending longitudinally along and adjacent the filtering medium surface for restraining surface flow of slimes toward said filtering medium surface, said sealing means providing an outlet opening in communication with said pool at a point separated from said filter medium by said baffle member for the removal of slimes from said pool.

3. Filtering apparatus comprising at least one cylindrical drum, a filter medium mounted on the outer periphery of said drum, a surface positioned in close juxtaposition to the outer periphery of said drum along a substantially horizontal line and at a greater distance from the drum above said line, end seals for the filtering apparatus, said surface and end seals being cooperatively arranged to provide a space above the drum adapted to receive a pool of pulp inclusive of solid particles, connections for establishing vacuum influences on the interior of said filter medium to draw the liquid in the pulp through said filter medium thereby causing the said solid particles to be deposited on the exterior face of said filter medium, means for rotating said drum to continuously remove the deposited solid particles out of said pool, and at least one vertically disposed baffle extending longitudinally between said end seals at the side of and into said pool at a point adjacent the intersection between said filter medium and pool, said end seals providing an outlet opening in communication with the surface of said pool of pulp at a point separated from said filter medium by said baffle for the removal of slimes from said pool.

4. Filtering apparatus comprising at least one cylindrical drum, a filter medium mounted on the outer periphery of said drum, a surface positioned in close juxtaposition to the outer periphery of said drum along a substantially horizontal line and at a greater distance from the drum above said line, end seals for the filtering apparatus, said surface and end seals being cooperatively arranged to provide a space above the drum adapted to receive a pool of pulp inclusive of solid particles, connections for establishing vacuum influences on the interior of said filter medium to draw the liquid in the pulp through said filter medium thereby causing the said solid particles to be deposited on the exterior face of said filter medium, means for rotating said drum to continuously remove the deposited solid particles out of said pool, a tank into which the lower portion of said drum extends adapted to contain a precoat material, and at least one baffle having a surface above the pool extending longitudinally at the side of and into said pool at a point adjacent the intersection between said filter medium and pool, said end seals providing an outlet opening in communication with the surface of said pool of pulp at a point separated from said filter medium by said baffle for the removal of slimes from said pool.

CLARENCE LYNN PETERSON.

(References on following page)

REFERENCES CITED

The following references are of record in the file of this patent:

UNITED STATES PATENTS

| Number | Name | Date |
|---|---|---|
| 620,786 | Koeper et al. | Mar. 7, 1899 |
| 958,068 | Arbuckle | May 17, 1910 |
| 1,449,774 | Najarian | Mar. 27, 1923 |
| 1,576,374 | Spanner | Mar. 9, 1926 |
| 1,906,916 | Mitchell | May 2, 1933 |
| 2,102,780 | Bielfeldt | Dec. 21, 1937 |

FOREIGN PATENTS

| Number | Country | Date |
|---|---|---|
| 273,072 | Germany | Apr. 9, 1913 |
| 532,968 | Germany | Sept. 16, 1931 |
| 443,475 | Great Britain | Feb. 28, 1936 |